United States Patent
Aila et al.

(10) Patent No.: US 9,269,182 B2
(45) Date of Patent: Feb. 23, 2016

(54) SYSTEM AND METHOD FOR IDENTIFYING ENTRY POINTS OF A HIERARCHICAL STRUCTURE

(75) Inventors: Timo Aila, Helsinki (FI); Samuli Laine, Helsinki (FI)

(73) Assignee: NVIDIA Corporation, Santa Clara, CA (US)

( * ) Notice: Subject to any disclaimer, the term of this patent is extended or adjusted under 35 U.S.C. 154(b) by 1733 days.

(21) Appl. No.: 12/204,986

(22) Filed: Sep. 5, 2008

(65) Prior Publication Data

US 2010/0077010 A1  Mar. 25, 2010

(51) Int. Cl.
*G06T 15/06* (2011.01)
*G06T 17/00* (2006.01)

(52) U.S. Cl.
CPC ............... *G06T 15/06* (2013.01); *G06T 17/005* (2013.01)

(58) Field of Classification Search
None
See application file for complete search history.

(56) References Cited

U.S. PATENT DOCUMENTS

| 7,403,494 | B2 | 7/2008 | Lee et al. |
| 2002/0078005 | A1 | 6/2002 | Shi et al. |
| 2003/0225781 | A1 | 12/2003 | Kusterer et al. |
| 2004/0249796 | A1 | 12/2004 | Azzam |
| 2008/0091435 | A1* | 4/2008 | Strope et al. .................. 704/277 |

OTHER PUBLICATIONS

J. Goldsmith and J. Salmon, Automatic Creation of Object Hierarchies for Ray Tracing, May 1987, IEEE Computer Graphics and Applications, vol. 7, Issue 5, pp. 14-20.*
J. Foley et al., Computer Graphics: Principles and Practice, Addison-Wesley Publishing Company, 2nd Edition, pp. 700-715.*
H. Weghorst et al., Improved Computation Methods for Ray Tracing, Jan. 1984, ACM Transactions on Graphics, vol. 3, pp. 52-69.*
KIPO Office Action, KIPO Appl. No. 10-2009-83534, mailed Jan. 21, 2011.
English Translation of KIPO Appl. No. 10-2009-83534 Preliminary Rejection.
Freeservers, "Tree Data Structure," Apr. 8, 2008, available at http://ideainfo.8m.com/, pp. 1-17.
Translated Office Action, German Patent Office, Pat. App. No. 10 2009 038 453.7, dated Apr. 7, 2010.
A. Reshetov, A. Soupikov, and J. Hurley, "Multi-Level Ray Tracing Algorithm," Proc. SIGGRAPH 2005.
A. Reshetov, "Faster Ray Packets—Triangle Intersection through Vertex Culling", Proc. RT07.
I. Wald, S. Boulos, and P. Shirley, "Ray Tracing Deformable Scenes using Dynamic Bounding Volume Hierarchies" Univ. of Utah, TR No. UUSCI-2006-023, 2006.

* cited by examiner

*Primary Examiner* — Matthew D Salvucci
(74) *Attorney, Agent, or Firm* — Artegis Law Group, LLP

(57) ABSTRACT

A method for identifying entry points of a hierarchical structure having a plurality of nodes includes the operations selecting a node of a hierarchical structure and testing it for identification as an entry point. The node is identified as an entry point, and the selection, testing, and identification operations are repeated for at least one additional node of the hierarchical structure to identify at least a second node as a respective second entry point for the hierarchical structure.

9 Claims, 8 Drawing Sheets

“SYSTEM AND METHOD FOR IDENTIFYING ENTRY POINTS OF A HIERARCHICAL STRUCTURE”

FIELD OF THE INVENTION

The present invention relates to hierarchical structures, and more particularly to systems and methods for identifying entry points of a hierarchical structure.

BACKGROUND

Hierarchical structures, such as logical tree structures, are known in many technical fields, and are employed to organize information in a logical form to facilitate storage and retrieval of the information. In a typical implementation, the highest node or "root" of the logical tree includes the most general information, with descendant nodes (i.e., child nodes, grandchild nodes, etc. moving away from the root node) providing additional detail as to a particular aspect of the information represented by the tree structure. It is, or course, desirable to navigate through the tree via the shortest path and/or in the shortest amount of time in order to store or retrieve information, and node traversal techniques for minimizing the time to perform these operations occupy engineers and scientists from a variety of different fields.

In the areas of graphics processing and rendering, ray tracing is a field which uses hierarchical structures for organizing information. Ray tracing involves a technique for determining the visibility of a primitive from a given point in space, for example, an eye, or camera perspective. Primitives of a particular scene which are to be rendered are typically located in nodes, and the nodes organized within a hierarchical tree. Ray tracing involves a first operation of "node traversal," whereby nodes of the tree are traversed in a particular manner in an attempt to locate nodes having primitives, and a second operation of "primitive intersection," in which a ray is intersected with one or more primitives within a located node to produce a particular visual effect. The operation of node traversal starts at a particular node or "entry point," where a test is made to determine if the node contains any primitives. The node traversal process continues from the entry point to descendant nodes in the tree, to test additional nodes for the presence of primitives which may intersect a ray that is visible or that can create a visual effect within the scene.

In some conventional embodiments, the node traversal process commences at the root of the tree, i.e., at the highest rank, or most general level of the scene. In many instances, however, the root does not contain primitives which are intersected by a ray that produces a visible effect within the scene, and accordingly, skipping the root node and starting at a lower ranked node is typically more optimal in terms of minimizing the time required for the node traversal process.

FIGS. 1A and 1B illustrate an improvement of the aforementioned node traversal process, as described by A. Reshetov et al. in "Multi-Level Ray Tracing Algorithm," Proc. SIGGRAPH 2005. The article describes a technique for identifying an entry point which is common to all primitive containing nodes which may be intersected by a ray. As can be seen in FIG. 1A, the technique represents an improvement compared to the conventional technique in which the entry point at the top node 110, as the entry point of the node traversal process is one rank lower at node 120, node 120 representing the common node for the primitive containing nodes 140, 150 and 160 which may be intersected by the ray.

FIG. 1B illustrates the tree structure when the primitive containing nodes are distributed a manner different from that shown in FIG. 1A. In particular, the root node 110 is identified as the best entry point, as it represents the common node for primitive containing, possibly intersected nodes 130, 140, 150 and 160. In such an instance, no benefit is gained from the disclosed improvement compared with the conventional approach, in which the root node 110 represents the entry point for node traversal.

Accordingly, what is needed is an improved method and system which provides more optimal entry points of a hierarchical structure.

SUMMARY

A method for identifying entry points of a hierarchical structure includes the operations selecting a node of a hierarchical structure and testing it for identification as an entry point. The node is identified as an entry point, and the selection, testing, and identification operations are repeated for at least one additional node of the hierarchical structure to identify at least a second node as a respective second entry point for the hierarchical structure.

DETAILED DESCRIPTION OF EXEMPLARY EMBODIMENTS

Figure 1A:
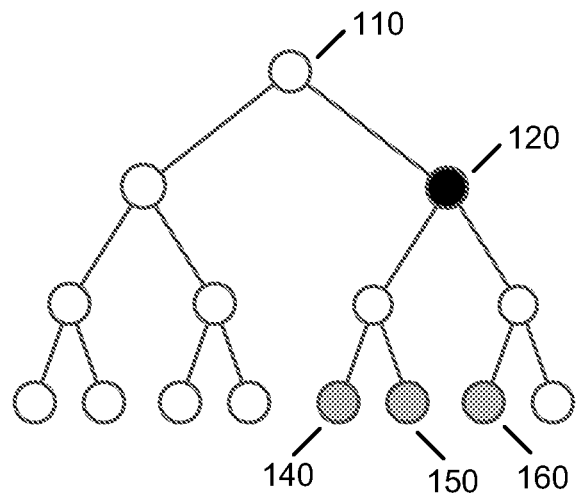
FIGS. 1A and 1B illustrates a conventionally known method of identifying an entry point within a hierarchical structure.
Figure 1B:
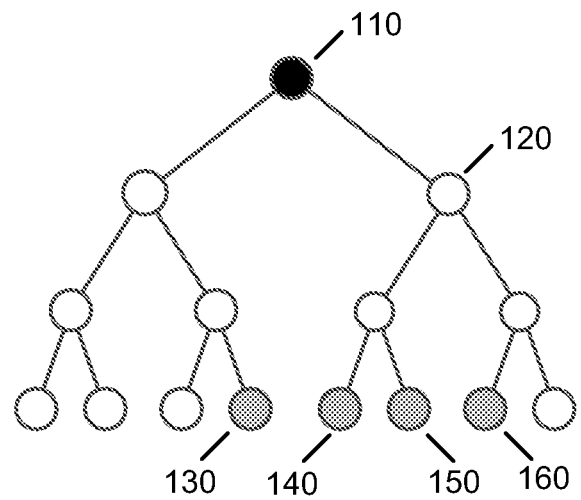
Figure 2:
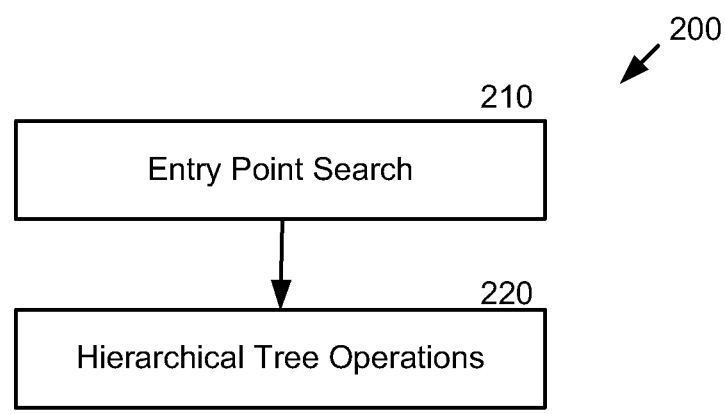
FIG. 2 illustrates an exemplary method for traversing a hierarchical structure in which the present invention finds utility.

FIG. 2 illustrates an exemplary method for traversing a hierarchical structure in which the present invention finds utility. At 210, an entry point search operation in which zero or more entry points of the hierarchical tree are identified. Exemplary embodiments of this process are illustrated below. At 220, hierarchical tree operations are initiated at the entry points. In one exemplary embodiment, operation 220 includes ray tracing operations, i.e., the execution of node traversal and primitive intersection operations, as known in the art. The present invention is not limited to ray tracing operations, and may be also employed in other applications in which hierarchical tree traversal is used.

Figure 3:
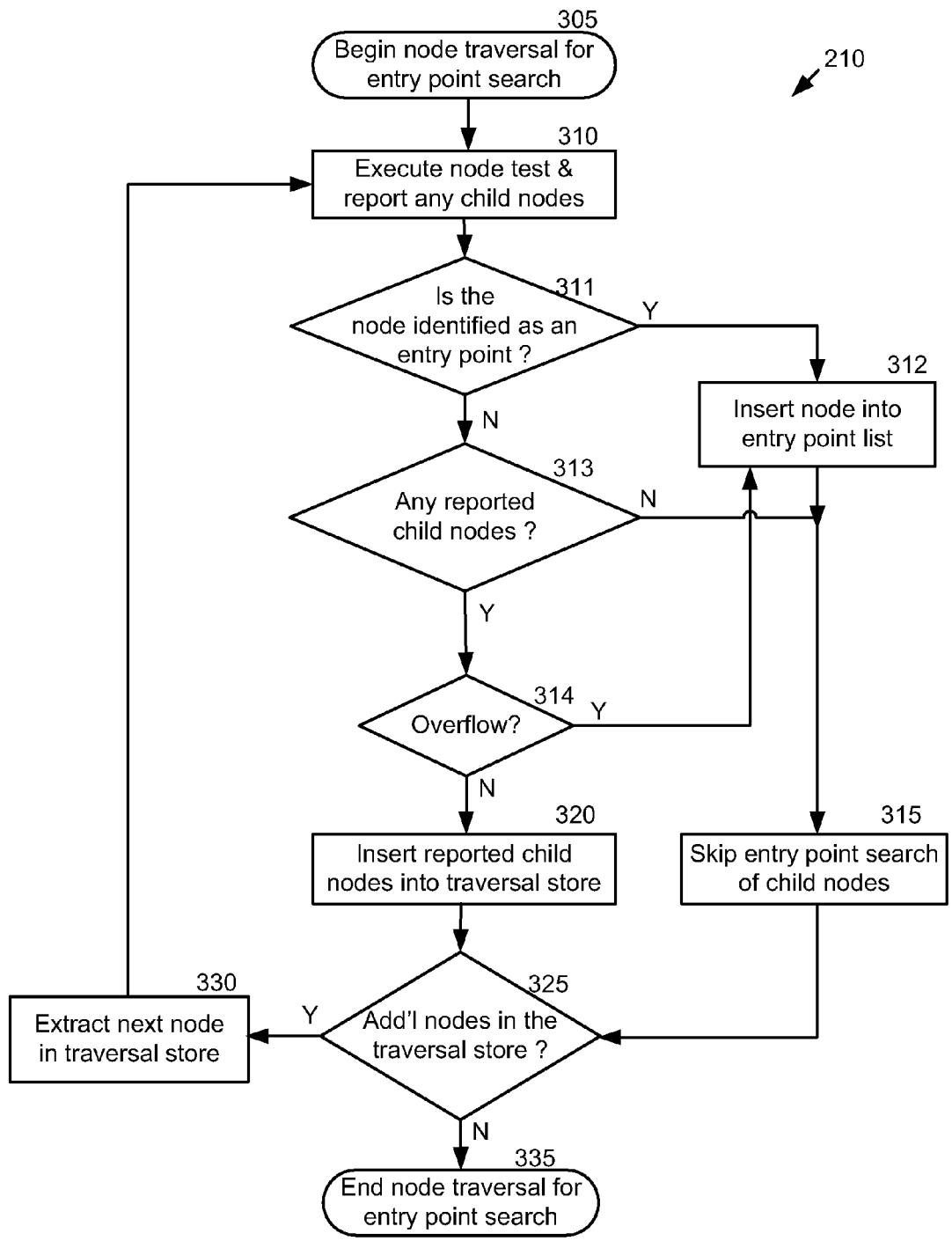
FIG. 3 illustrates a first exemplary embodiment of an entry point search operation shown in FIG. 2.

FIG. 3 illustrates a first exemplary embodiment of an entry point search operation 210 shown in FIG. 2. The process involves a node traversal operation, whereby particular nodes are searched for particular conditions, as detailed below. At 310, a node test is executed, and optionally, child nodes (if any) of the tested node are reported. As known, "child nodes" are nodes which are one level removed (moving away from the root) from the node tested at 310. Exemplary embodiments of operation 310 are further illustrated and described in FIGS. 4A (method 400) and 5A (operation 500) below. In an alternative embodiment, a test for any descendant node can be performed, since the detection of any descendant node would necessarily mean that at least one child node of the tested node exists.

At 311, a determination is made as to whether the node test at 310 is identified as an entry point. If so, the tested node is included in a list of entry points at 312 (the list defining an "entry point cut" illustrated below), and any child or descendant nodes of the tested node are skipped for further entry point search operations (operation 315). As described herein, a node which is skipped, not included, or excluded from further entry point search operations or from inclusion in an entry point list may be ignored (i.e., no further processing is executed upon it), or it may be tagged or identified in some manner, such that the node is disregarded if a process or operation considers the node again. If at 311, the determination is negative, a further determination is made at 313 as to whether the node tested at 310 includes any child nodes reported at 310. If the tested node did not report any child nodes at 310, the method continues at 315 in which an entry point search for any child or descendant nodes of the particular tested node are skipped.

If at 313, one or more child nodes of the tested node are reported, a further determination is made at 314 as to whether an entry point list overflow occurs. An overflow condition can occur when the number of entry points in the entry point list plus the number of nodes in traversal store plus the number of child nodes reported at 310 exceeds a predefined maximum number of entry points. If an overflow occurs, the tested node is identified as an entry point and included in a list of entry points at 312. Further exemplary, any child or descendant nodes of the tested node are skipped for further entry point search operations (operation 315). This ensures correctness while allowing the method to conclude when memory resources are bounded. If no overflow condition is detected at 314, the child nodes reported by node test 310 are inserted into the traversal store at 320 and the method continues to 325. As the skilled person will appreciate, the overflow test in 314 is optional and can be omitted if no limit is imposed on the number of entry points allowed in the entry point list. Upon completion of operation 315 the method continues at 325, whereby a determination is made as to whether there are any additional nodes in the traversal store of the entry point search. If so, the process continues at 330, whereby the next node in the traversal store is selected, and the method returns to operation 310 therefor. If at 325, no additional nodes remain in the traversal store, node traversal operations for the entry point search operations conclude.

Entry Point Search Using a Bounding Volume of Rays

Figure 4A:
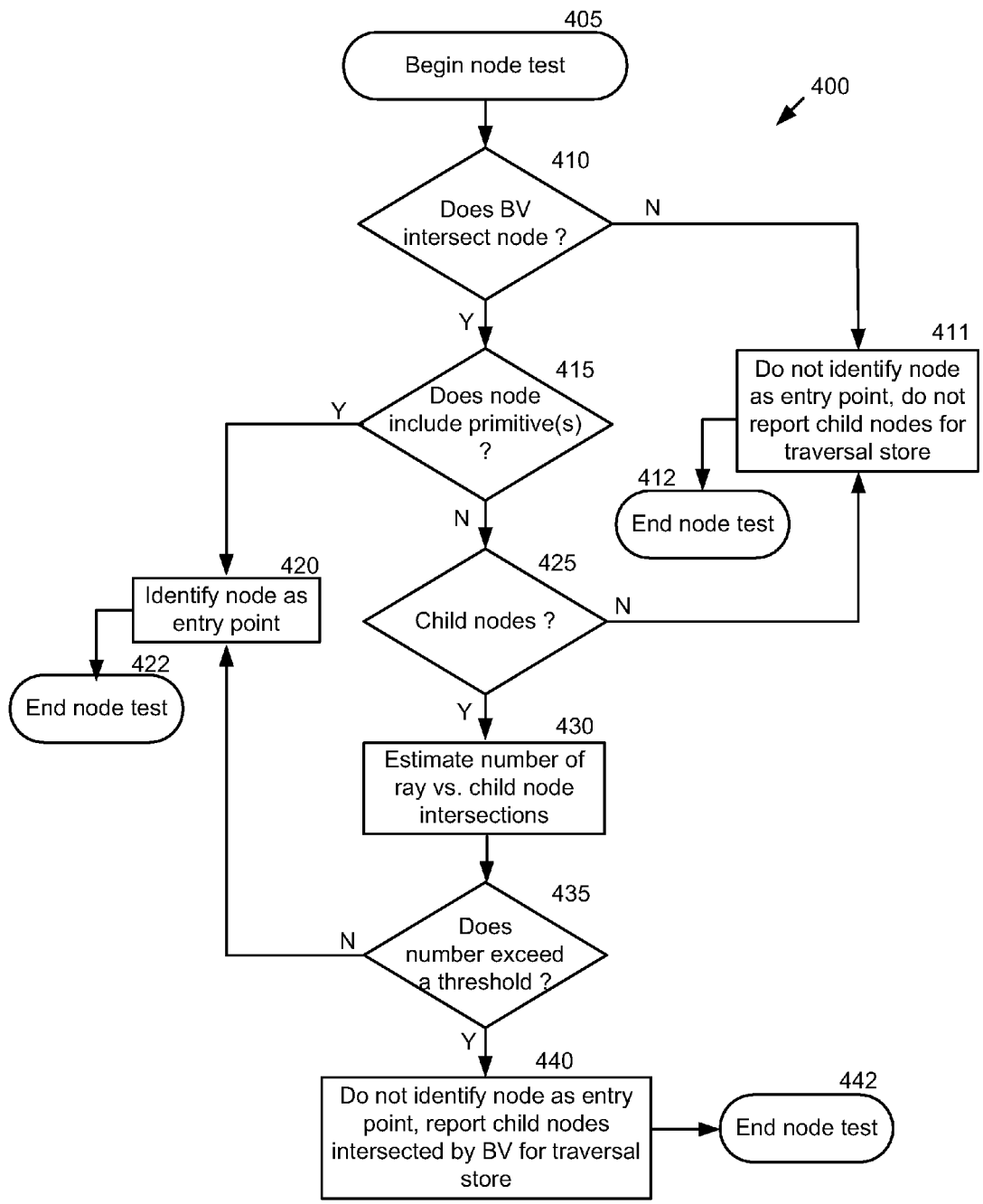
FIG. 4A illustrates a first exemplary embodiment of an entry point identification operation shown in FIG. 3.

FIG. 4A illustrates a first exemplary embodiment of the entry point identification operation 310, whereby a node is tested for use as an entry point. In this embodiment 400, a bounding volume (BV) of rays is used to determine if the tested node should be included in a list of one or more entry points. In particular, if the BV does not intersect a node of the hierarchical tree, than neither will any of the rays within the BV intersect the node, and this information can be used to determine whether the node is to be identified as an entry point. The number of rays within the BV may vary, e.g., 1, 2, 4, 8, 16, 32, 64, 128, 1024 or more rays. The skilled person will appreciate that any number of rays may be implemented within the BV, and that the BV may be a subgroup of rays within a larger BV. The BV may take on any geometric shape, e.g., a shaft, a frustum, or another suitable volumetric shape.

At 410, a determination is made as to whether the tested node is intersected by the BV of rays. Such a test may be performed using any means, including conventional geometric tests. If the determination is negative, the node is not identified as entry point and further, no child nodes of the tested node (if any) are reported at 411. The method concludes at 412, and entry point search operations 210 continue with operations 311, 313, 315 and 325 shown in FIG. 3. If the node is determined to be intersected by the BV, the method continues at 415.

At 415, a determination is made as to whether the tested node includes an object (i.e., one or more objects). The term "object" or "objects" as used herein refers to any data against which a query may be tested, and includes primitives, such as triangles, squares, spheres, points, lines, data objects, and any other data that meets the aforementioned definition. In a particular embodiment, the method 310 is applied to a hierarchical structure such as those commonly used in the field of ray tracing, e.g., bounding volume hierarchies, k-dimensional trees, octrees, or binary space partitioning trees whose nodes include primitives. However, the method 310 is not to such an exemplary embodiment, and it may be implemented in other applications in which different hierarchical structures and/or different objects are employed.

If, at 415, a determination is made that the node includes an object (e.g., a primitive) the node is identified as an entry point (operation 420). The node test concludes at 422, and the process returns to operations 311 and 312, where the node is inserted into the entry point list, and 315, where entry point search of descendant nodes of the tested node (child nodes, grandchild nodes, etc., moving further away from the root node side of the tested node) is skipped and subsequently at 325 and 330, the next non-descendant node in the traversal store is retrieved for entry point search identification operations 310 in any of the embodiments described herein.

If a determination is made at 415 that the tested node does not include a primitive, the process continues at 425 in which a determination is made as to whether the present node includes any child node(s). If the tested node includes no child nodes, the method returns to 411 where the tested node is not identified as an entry point and zero child nodes thereof are reported for loading into the traversal store. The process returns to operations 311, 313, 315 and 325 of FIG. 3, where the next non-descendant node in the traversal store is tested per any of the methods 310 as described herein.

If, at 425, the tested node does include one or more child nodes, the process continues at 430, where an estimate is made as to the collective number of intersections between the child nodes and the rays in the ray packet. In a specific embodiment, this estimate is computed by the following process: (a) for each child node of the presently-tested node, (i) identifying a planar area of a child node which is intersected by the BV of rays; (ii) determining, as a percentage, the intersected planar area of the child node versus the total planar area intersected by the BV of rays; (iii) and multiplying the percentage by the number of rays within ray packet to determine the estimated number of rays which intersects the child node, and (b) summing together the results of (a).

The method continues at 435, where a determination is made as to whether the estimated number of rays computed in 430 meets or exceeds a predefined threshold. In particular, a determination is made as to whether the estimated number of rays (i.e., the estimated total number of intersections between the rays and the child nodes of the presently-tested node) meets or exceeds a particular value. The predefined threshold may be defined as different values, for example as a ratio, such as 25%, 50%, 75%, 100%, 125%, 150% or 175% of the number of rays in the BV, or as a number of intersections, such as 1, 2, 4, 8, 16, 64, 256, 4096, or more intersections. Those skilled in the art will appreciate that other metrics may be used to define the threshold as well.

At 435, if the collective number of estimated intersections is below the predefined threshold, it can be assumed that a significant number of rays in the BV may miss the child nodes. In such a case, the tested node is identified as an entry point (as shown by the process returning to operation 420) because it can be expected to be more efficient to process the rays individually in the subtree starting from this node. If the collective number of estimated intersections meets or exceeds the predefined threshold, a sufficient number of rays in the BV is likely to intersect the child nodes, and accordingly, the entry point search process can be continued at each of these child nodes per operation 330 in FIG. 3. In such an instance, the presently-tested node is not identified as an entry point, and child nodes intersected by BV are reported to be inserted in traversal store (operation 440), and the testing process for the present node concludes at 442. As noted, the testing process would eventually be performed for each of the child nodes, and possibly for descendant nodes thereof, in the aforementioned manner per operation 330 shown in FIG. 3. Unless overflow is detected at 314, the process continues at 320 where the child nodes reported at 440 are inserted into a traversal store, and continuing with operations 325 and 330 where the next node in the traversal store is tested per any of the methods 310 described herein.

Figure 4B:
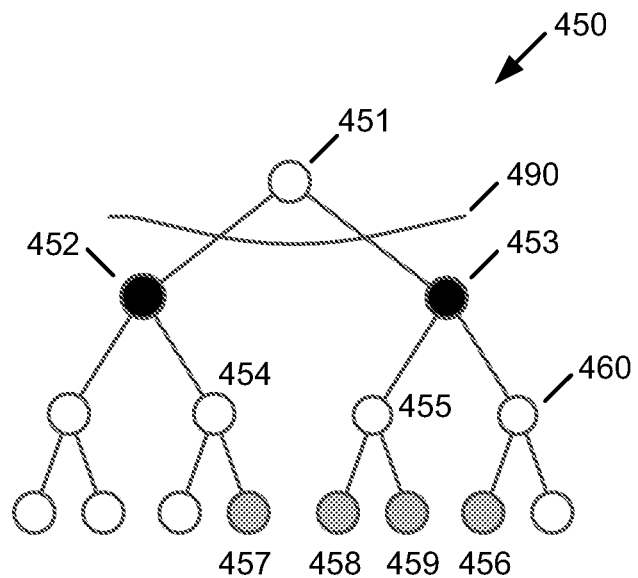
FIG. 4B illustrates a hierarchical tree displaying entry point nodes identified in accordance with the method of FIG. 4A.

FIG. 4B illustrates a hierarchical tree 450 displaying entry point nodes identified in accordance with FIG. 4A. Primitive-containing nodes 456-459 which may be intersected by the BV are shown in grey. Entry point nodes 452 and 453 are shown in black. The root node is shown as node 451.

In a particular implementation of the process of FIG. 4A, root node 451 represents a non-primitive-containing node which is intersected by the BV of rays (operations 410 and 415) and which includes child nodes (operation 425), whereby the collective number of estimated intersections for child nodes 452 and 453 meets or exceeds a predefined threshold (operations 430 and 435). In such an instance, root node 451 is not listed as an entry point, and the node traversal process 210 continues for each of nodes 452 and 453.

Operation 310 in FIG. 4A is subsequently executed for each of nodes 452 and 453, whereby each of nodes 452 and 453 represent a BV intersected non-primitive-containing node (operations 410 and 415) having child nodes (operation 425), wherein those child nodes are intersected with a number of BV rays which do not exceed a predefined threshold (operations 430 and 435). In such a case, each of nodes 452 and 453 are listed as an entry point, per operation 435 (via the "no" decision path). Descendants of these nodes, including nodes 454-460, are not tested for entry point identification, as per operation 315. Inclusion of nodes 452 and 453 within the entry point listing is shown diagrammatically by means of an entry point cut 490.

Entry Point Search Using Probe Ray

Figure 5B:
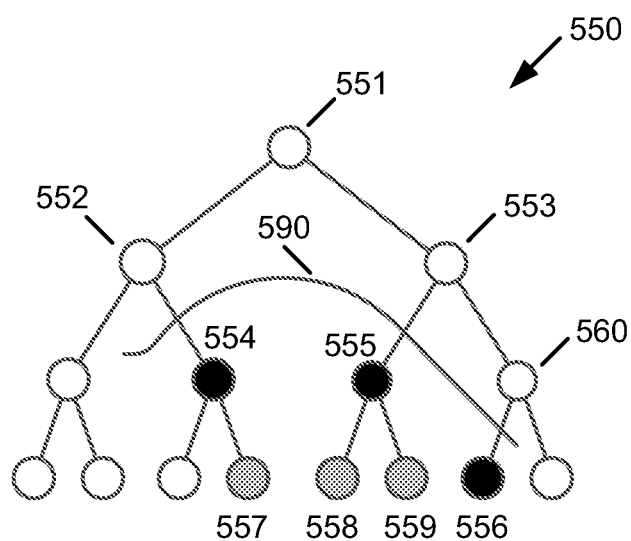
FIG. 5B illustrates a hierarchical tree displaying entry point nodes identified in accordance with the method of FIG. 5A.
Figure 5A:
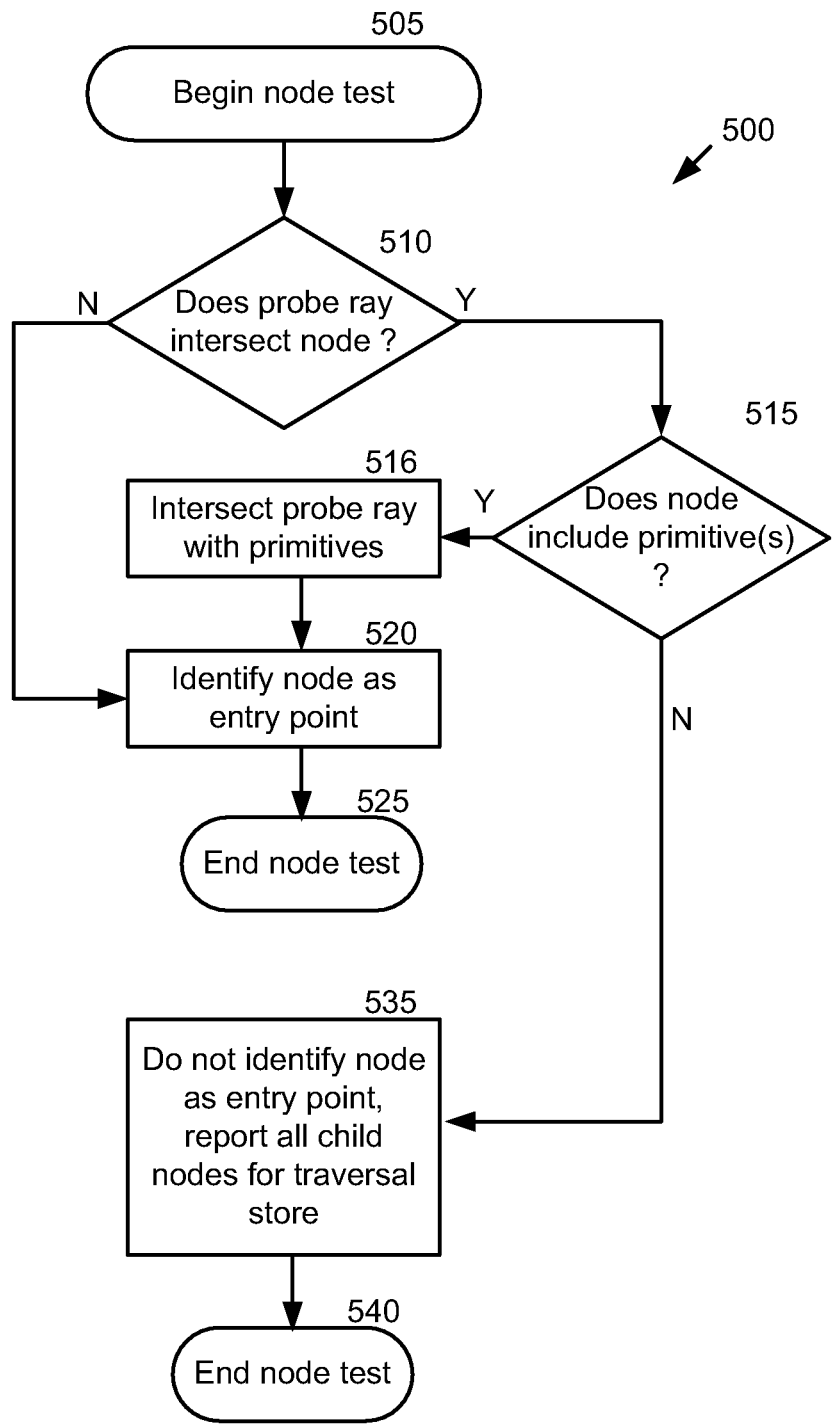
FIG. 5A illustrates a second exemplary embodiment of the entry point identification operation shown in FIG. 3.

FIG. 5A illustrates a second exemplary embodiment of the entry point identification operation 310, whereby a node is tested for use as an entry point. In this embodiment 500, a probe ray representative of a ray packet is used to test intersection with one or more nodes within the hierarchical tree. As known in the art, a ray packet is a collection of rays, for example, 1, 2, 4, 8, 16, 32, 64, 128, 1024 or more rays. The probe ray may be selected from the ray packet in a variety of ways, e.g., it may be a randomly selected ray from the ray packet, or the median ray of ray packet may be selected as the probe ray. Further alternatively, the probe ray may be computed, e.g., a mean probe ray which is computed as a mean of all rays within the ray packet may be used. As an optional optimization, if the probe ray is one of the rays in the ray packet, the closest intersection found by the probe ray may be used for computing the result of the corresponding ray.

At 505, the test of the particular node commences, and at 510 a determination is made as to whether the selected probe ray intersects the node. If at 510, the probe ray is determined to intersect the node, a determination is made at 515 as to whether the node includes an object, e.g., one or more primitives. If so, the probe ray is intersected with all of the objects in the node at 516. If the probe ray intersects one or more objects, it may be shortened so that it terminates at the intersection closest to the ray's origin. The node is identified as an entry point (operation 520). The node test concludes at 525, and the process returns to operation 311 and 312, where the node is inserted into the entry point list, and 315, where entry point search for descendant nodes of the tested node is skipped, and at 325 the next non-descendant node in the traversal store is retrieved for entry point search identification operations 310 in any of the embodiments described herein. If, at 515, the node is determined not to include any objects, at 535 the node is not identified as an entry point, and all child nodes (if any) are reported for traversal store at operation 320. The node test concludes at 540, and unless overflow is detected at 314 the process returns to operation 320 in which the reported child nodes are inserted into the traversal store for further entry point search identification operations 310 in any of the embodiments described herein.

If, at 510, the node is determined not to have been intersected by the probe ray, the node is identified as an entry point (operation 520). The node test concludes at 525, and the process returns to operation 312.

While the aforementioned embodiments involve the use of one probe ray in determining an intersection condition, any number of probe rays (e.g., 2, 8, 16, 32, etc.) may be used as well. In such an embodiment, an intersection condition may be determined at operation 510 when any one or a predefined number of the probe rays is found to intersect with the tested node.

FIG. 5B illustrates a hierarchical tree 550 displaying entry point nodes identified in accordance with FIG. 5A. Primitive-containing nodes 556-559 which may be intersected by the probe ray are shown in grey. Entry point nodes 554, 555 and 556 are shown in black. The root node is shown as node 551.

In a particular implementation of the process of FIG. 5A, root node 551 represents a non-primitive-containing node which is intersected by the probe ray, said node being excluded from the entry point list per operations 510, 515 and 535. Nodes 552 and 553 represent child nodes which are intersected by the probe ray and which also do not include primitives. These nodes are excluded from entry point listing per operations 310, 510, 515, and 535. Node 560, a child node of node 553, is an intersected, non-primitive containing node, and is also excluded from entry point listing per operations 310, 510, 515, and 535. Nodes 554 and 555 represent non-primitive-containing nodes which are not intersected by the probe ray. As such these nodes are included in the entry point listing per operations 310, 510, 520, and 312. Descendants of these nodes, including nodes 557, 558, and 559, are not tested for entry point identification, as per operation 315.

Node 556 represents an intersected, primitive-containing node, and is included within the entry point listing, per operations 310, 510, 515, 520, and 312. Inclusion of nodes 554, 555, and 556 within the entry point listing is shown diagrammatically by means of an entry point cut 590.

The number of entry points identified in operation 210 and/or employed in operation 220 may vary, depending, e.g., the number of entry points identified, or the amount of memory space or computational resources allocated thereto. As an example, for each BV processed in operations 210 and 220, two, four, eight, 16, 32, 128, 256, 512, 1028, 2056, or more entry points may be allocated. The number of entry points allocated may be fixed or dynamic, the latter being based, for example, on available memory storage or actual number of entry points identified per operation 210.

As the skilled person will appreciate, operation 210 may involve any one or more of the entry point identification operations 400 or 500 illustrated in FIGS. 4A, and 5A. In one embodiment, for example, an entry point search operation 400 may employ repeated operations thereof. In another embodiment, the entry point search operation 210 may employ alternating operations of the entry point search processes 400 and 500 shown in FIG. 4A and FIG. 5A, respectively. Any combination of the entry point search processes 400 and 500 may be used in accordance with the present invention.

In one embodiment, multiple implementations of 310, e.g., the first embodiment 400 and the second embodiment 500, are executed and their results combined. The combination is straightforward if all of the embodiments agree to either insert the node into entry point list or to exclude the node from the entry point list. In case the embodiments disagree, either decision leads to a valid entry point list. In order to benefit from multiple embodiments, the advantages of each embodiment are preferably considered. For example, the embodiment of FIG. 4A may be preferred when it concludes an entry point should be inserted compared to proposing exclusion because it does not know when the rays terminate due to occlusion. The second embodiment of FIG. 5A does notice when probe rays terminate due to occlusion, and as a result, may be preferred when it concludes an entry point should be inserted. Therefore, one way of combining the embodiments is to insert an entry point if at least one embodiment suggests so. Those skilled in the art will appreciate that there are numerous ways of combining the results of multiple embodiments, and different ways may be appropriate depending on the use case.

As illustrated in FIG. 2, the ray tracing method 200 includes two operations of entry point search and per ray tracing operations 220. This two-kernel approach decouples the resource requirements of each kernel, which is an important feature on processor architectures that have limited per-thread resources. The two-kernel approach substantially reduces implementation overhead compared to frequent switching between the two kernels, and allows separate optimizations to be performed on both processes. For example, a single-kernel hierarchical traversal method employing a 32 thread warp width and 32-ray ray packets would require $32^2=1024$ rays per warp, a significant amount of rays which would be required to fill the SIMD machine. The present two kernel approach improves this situation, as only the entry point identification kernel is executed once per 32 rays, requiring $32^2$ rays per warp. The per-ray kernel is executed for each ray, requiring a factor of 32 fewer rays to fill the SIMD machine.

Figure 6:
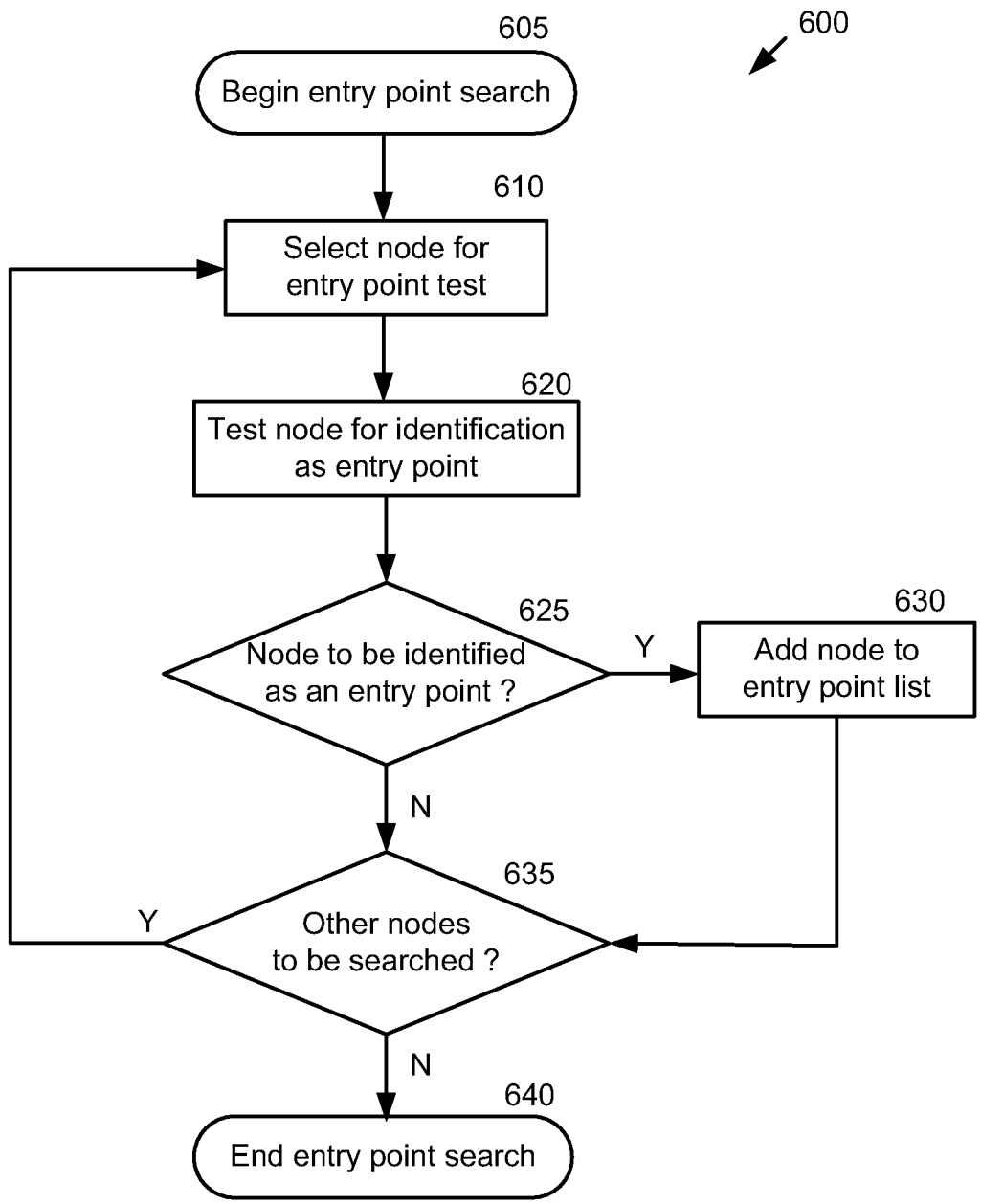
FIG. 6 illustrates a second exemplary embodiment of the entry point search operation shown in FIG. 2.

FIG. 6 illustrates a second exemplary embodiment of the entry point search operation 210 of FIG. 2. At 605, the entry point search operation 600 commences, and at 610 a node of the hierarchical structure is selected for testing. At 620, the selected node is tested, and at 625, a determination is made as to whether the node is to be identified as an entry point. If so, the method continues as 630 where the node is added to an entry point list. If the node is not to be identified as an entry point, the method continues at 635 where a determination is made as to whether any further nodes of the hierarchical structure are to be tested for identification as entry points. If so, the method continues at 610 where a further node is selected for entry point testing. If no further nodes are to be tested, the entry point search operation concludes at 640.

Operation 610 may be performed using any node selection process, e.g., conventional node traversal operations. In a particular embodiment, operation 610 is performed in accordance with operation 330 shown in FIG. 3, in which nodes are extracted from a traversal store. Those skilled in the art will appreciate that other node selection techniques may be used as well.

Operation 620 may include any entry point test operation, some exemplary embodiments of which are disclosed herein. For example, operations 311, 313, and 314 of FIG. 3 may be performed to determine if the selected node is to be identified as an entry point. Further exemplary, operations 410 and 415, or 410, 415, 425, 430, and 435 of FIG. 4 may be performed in accordance with this operation. Also operation 510 alone, or in combination with 515, and 516 of FIG. 5 may be performed to determine if the selected node is to be identified as an entry point. These exemplary embodiments represent only a few examples of entry point tests that can be used to determine if a node in the hierarchical structure is to be identified as an entry point, and the person skilled in the art that other tests may be used as well under the present invention.

The method 600 of FIG. 6 represents an embodiment of operation 210, and accordingly, it may be implemented as part of a larger hierarchical traversal and processing operation 200 in which one or more entry points are identified to initiate traversal and processing of the tree. For example, the method 600 of FIG. 6 may be used to define entry points of hierarchical tree over which ray tracing node traversal and primitive intersection operations are to be performed. The method 600 of FIG. 6 is not limited to this particular application, and indeed may be applied to search any hierarchical structure of entry points.

Figure 7:
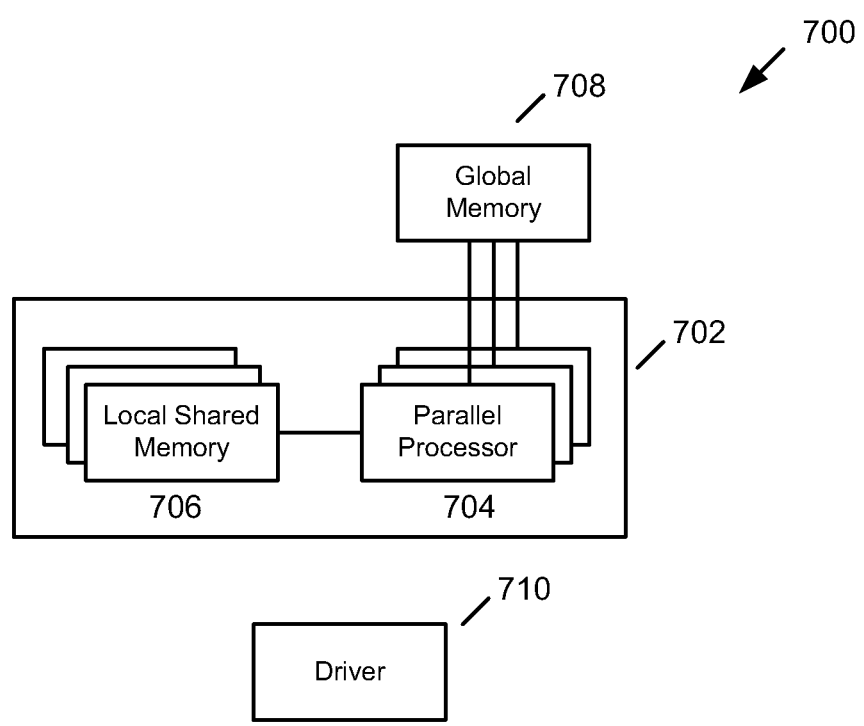
FIG. 7 illustrates an exemplary system operable to perform the operations illustrated in FIGS. 2-6.

FIG. 7 illustrates an exemplary system operable to perform the operations illustrated in FIGS. 2-6 in accordance with the present invention. System 700 includes a parallel processing system 702, which includes a plurality of parallel processing architectures 704, each configured to operate on a predetermined number of threads. Accordingly, each parallel processing architecture 704 may operate in parallel, while the corresponding threads may also operate in parallel. In a particular embodiment, the parallel processing architecture 704 is a single instruction multiple data (SIMD) architecture of a predefined SIMD width or "warp," for example 32, 64, or 128 threads. The parallel processing system 702 may include a graphics processor, or other integrated circuits equipped with graphics processing capabilities.

The parallel processing system 702 may further include local shared memory 706, which may be physically or logically allocated to a corresponding parallel processing architecture 704. The system 700 may additionally include a global memory 708 which is accessible to each of the parallel processing architectures 704. The system 700 may further include one or more drivers 710 for controlling the operation of the parallel processing system 702 in accordance with the methods of FIGS. 2-6. The driver 710 may include one or more libraries for facilitating control of the parallel processing system 702.

In a particular embodiment of the invention, each parallel processing architecture 704 is configured to perform entry point search operations 210, as described in FIGS. 4A, 5A, and 6. Further particularly, the parallel processing system is operable to additionally perform the hierarchical tree operations 220, as described in FIG. 2 as well, such operations including node traversal and primitive intersection operations for ray tracing operations in an exemplary embodiment.

In a particular embodiment, the parallel processing architecture 704 processing circuitry operable to identify a plurality of nodes of a hierarchical structure as entry points, the processing circuitry operable to select a node of a hierarchical structure and test it for identification as an entry point. The processing circuitry is further operable to identify the node as an entry point, and repeat each of the selection, testing, and identification operations for at least one additional node of the hierarchical structure to identify at least a second node as a respective second entry point for the hierarchical structure.

The processing circuitry of the parallel processing architecture 704 and/or system 702 is operable to perform any of the operations illustrated in FIGS. 2-6 herein. In an embodiment exemplified by FIG. 3, the processing circuitry operable to select a node is operable to perform any one or more of operations 315, 320, 325 and 330. Further exemplified by FIG. 3, the processing circuitry is operable to generate an entry point list as per operation 312. In an embodiment exemplified by FIG. 4A, the processing circuitry operable to test the selected node is operable to perform any one or more of the operations of 410, 415, 425, 430, and 435. In an embodiment exemplified by FIG. 5A, the processing circuitry operable to test the selected node is operable to perform any one or more of the operations 510, 515 and 516.

Further exemplary, the processing circuitry operable to identify the tested nodes as an entry point is operable to perform the operations of identifying a node as an entry point, for example, operation 420 in FIG. 4A, and operation 520 in FIG. 5A.

Further exemplary, the processing circuitry is operable to perform an operation of excluding the tested node from the entry point list, such as any one or more of the operations 411 and 440 shown in FIG. 4A, and operation 535 shown in FIG. 5A. The processing circuitry is further operable to perform any one or more of the operations shown in FIG. 6.

As readily appreciated by those skilled in the art, the described processes and operations may be implemented in hardware, software, firmware or a combination of these implementations as appropriate. In addition, some or all of the described processes and operations may be implemented as computer readable instruction code resident on a computer readable medium, the instruction code operable to control a computer of other such programmable device to carry out the intended functions. The computer readable medium on which the instruction code resides may take various forms, for example, a removable disk, volatile or non-volatile memory, etc., or a carrier signal which has been impressed with a modulating signal, the modulating signal corresponding to instructions for carrying out the described operations.

The terms "a" or "an" are used to refer to one, or more than one feature described thereby. Furthermore, the term "coupled" or "connected" refers to features which are in communication with each other (electrically, mechanically, thermally, optically, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serve to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for identifying a plurality of entry points of a hierarchical structure having a plurality of nodes, the method comprising:
    selecting a first node of a hierarchical structure;
    determining the plurality of entry points by performing an entry point search operation at the first node; and
    for each entry point in the plurality of entry points, initiating a hierarchical tree operation at the entry point,
    wherein the entry point search operation is performed by a processor and comprises the steps of:
        performing a node test for the first node;
        determining whether the first node is identified as an entry point based on the node test;
        if the first node is not identified as an entry point, then inserting any child nodes included in the first node into a node traversal list, or
        if the first node is identified as an entry point, then inserting the first node into an entry point list; and
        if the node traversal list is not empty, then selecting a next node from the node traversal list and performing the entry point search operation at the next node, and
    wherein the node test identifies the first node as an entry point when:
        a bounding volume associated with a plurality of rays intersects the first node; and
        the first node includes a primitive.

2. The method of claim 1, wherein, if the first node does not include a primitive and has one or more child nodes, the node test identifies the first node as an entry point when:
    a bounding volume associated with a plurality of rays intersects the first node; and
    an estimated number of intersections between the plurality of rays and the one of more child nodes does not exceed a threshold value.

3. The method of claim 1, wherein if the first node is not identified as an entry point, the entry point search operation further comprises:
    determining whether an entry point list overflow condition exists; and
    if the entry point list overflow condition exists, then inserting the first node into the entry point list, or
    if the entry point list overflow condition does not exist, then inserting any child nodes included in the first node into the node traversal list.

4. A non-transitory computer readable medium including instructions that, when executed by a processor, perform steps for identifying a plurality of entry points of a hierarchical structure having a plurality of nodes, the steps comprising:
- selecting a first node of a hierarchical structure;
- determining the plurality of entry points by performing an entry point search operation at the first node; and
- for each entry point in the plurality of entry points, initiating a hierarchical tree operation at the entry point,
- wherein the entry point search operation is performed by the processor and comprises the steps of:
  - performing a node test for the first node;
  - determining whether the first node is identified as an entry point based on the node test;
  - if the first node is not identified as an entry point, then inserting any child nodes included in the first node into a node traversal list, or
  - if the first node is identified as an entry point, then inserting the first node into an entry point list; and
  - if the node traversal list is not empty, then selecting a next node from the node traversal list and performing the entry point search operation at the next node, and
- wherein the node test identifies the first node as an entry point when:
  - a bounding volume associated with a plurality of rays intersects the first node; and
  - the first node includes a primitive.

5. The non-transitory computer readable medium of claim 4, wherein, if the first node does not include a primitive and has one or more child nodes, the node test identifies the first node as an entry point when:
- a bounding volume associated with a plurality of rays intersects the first node; and
- an estimated number of intersections between the plurality of rays and the one of more child nodes does not exceed a threshold value.

6. The non-transitory computer readable medium of claim 4, wherein if the first node is not identified as an entry point, the entry point search operation further comprises:
- determining whether an entry point list overflow condition exists; and
- if the entry point list overflow condition exists, then inserting the first node into the entry point list, or
- if the entry point list overflow condition does not exist, then inserting any child nodes included in the first node into the node traversal list.

7. A parallel processing architecture for identifying a plurality of entry points of a hierarchical structure having a plurality of nodes, the parallel processing architecture configured to:
- select a first node of a hierarchical structure;
- determine the plurality of entry points by performing an entry point search operation at the first node; and
- for each entry point in the plurality of entry points, initiate a hierarchical tree operation at the entry point,
- wherein the entry point search operation comprises the steps of:
  - performing a node test for the first node,
  - determining whether the first node is identified as an entry point based on the node test,
  - if the first node is not identified as an entry point, then inserting any child nodes included in the first node into a node traversal list, or
  - if the first node is identified as an entry point, then inserting the first node into an entry point list, and
  - if the node traversal list is not empty, then selecting a next node from the node traversal list and performing the entry point search operation at the next node, and
- wherein the node test identifies the first node as an entry point when:
  - a bounding volume associated with a plurality of rays intersects the first node; and
  - the first node includes a primitive.

8. The parallel processing architecture of claim 7, wherein, if the first node does not include a primitive and has one or more child nodes, the node test identifies the first node as an entry point when:
- a bounding volume associated with a plurality of rays intersects the first node; and
- an estimated number of intersections between the plurality of rays and the one of more child nodes does not exceed a threshold value.

9. The parallel processing architecture of claim 7, wherein if the first node is not identified as an entry point, the entry point search operation further comprises:
- determining whether an entry point list overflow condition exists; and
- if the entry point list overflow condition exists, then inserting the first node into the entry point list, or
- if the entry point list overflow condition does not exist, then inserting any child nodes included in the first node into the node traversal list.

* * * * *